June 1, 1954   H. C. OBER   2,679,794
TILLING TOOL FOR ROTARY TILLING DEVICES
Filed Oct. 4, 1951   2 Sheets-Sheet 1
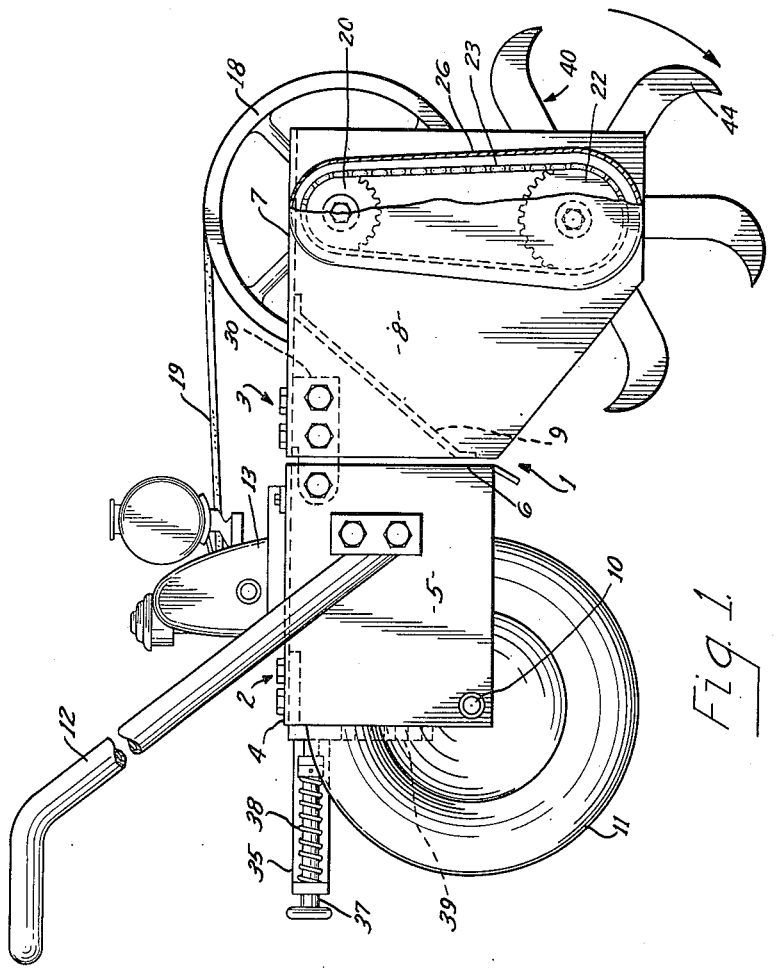
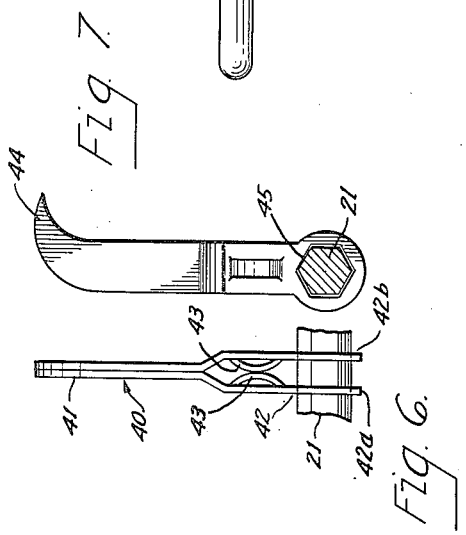
INVENTOR.
Howard C. Ober,
BY
Gehr & Leonard,
his ATTORNEYS.

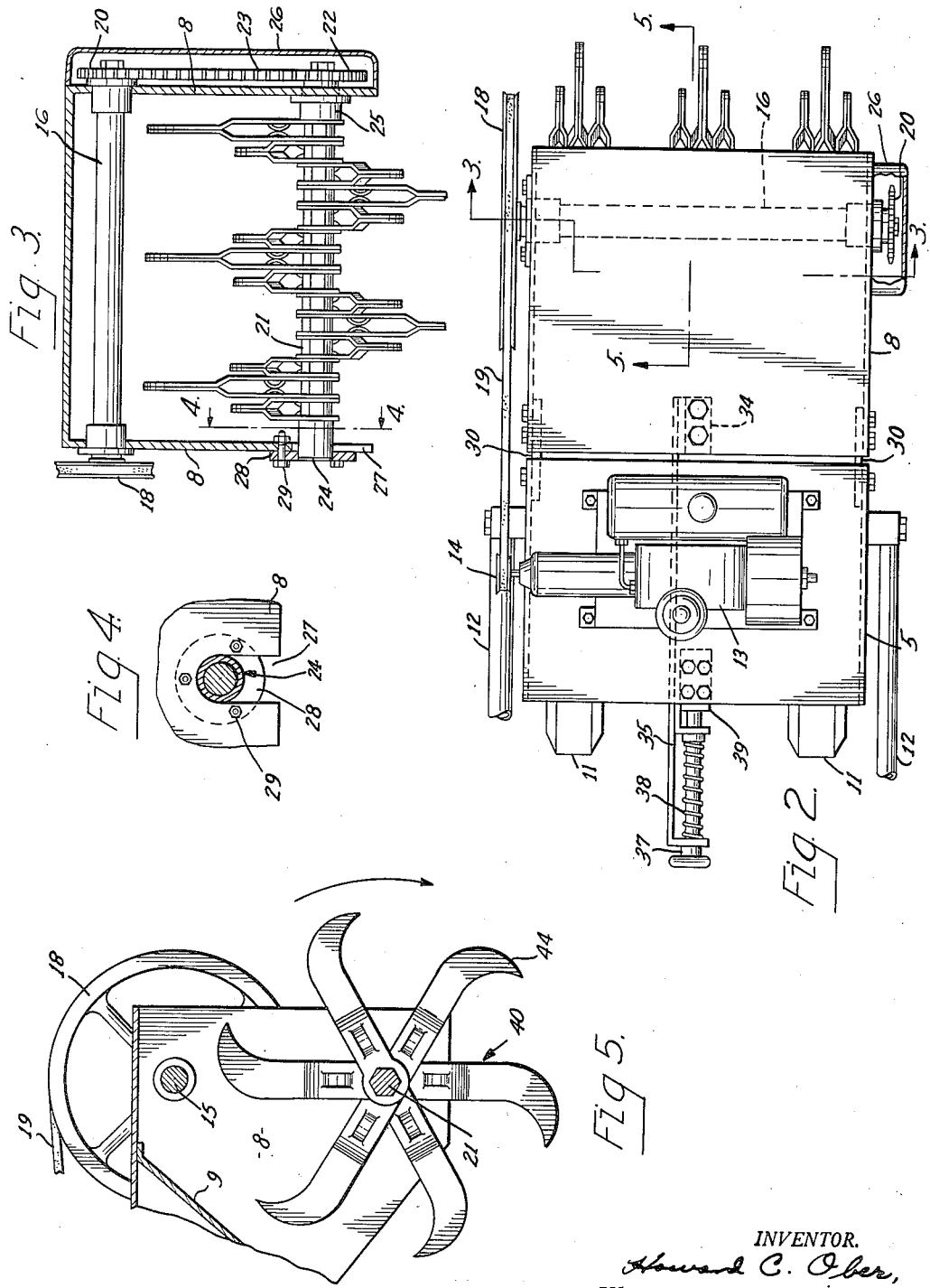

Patented June 1, 1954

2,679,794

UNITED STATES PATENT OFFICE 2,679,794

TILLING TOOL FOR ROTARY TILLING DEVICES

Howard C. Ober, Newbury, Ohio

Application October 4, 1951, Serial No. 249,776

3 Claims. (Cl. 97—216)

1

This invention relates to a rotary tilling device and is a continuation in part of my copending application Serial No. 88,532 filed April 20, 1949, now United States Letters Patent No. 2,633,789, issued April 7, 1953.

The present invention is directed principally to the rotary tilling tool of the device and particularly to the construtcion of the individual cutting teeth of the tool and the relation between the individual cutting teeth and the shaft on which they are accommodated, whereby the shocks and stresses imposed by the teeth striking obstructions in the ground are partially absorbed so as to relieve the remainder of the apparatus or device from excessive stresses.

Various specific objects and advantages of the invention will become apparent from the following description, wherein reference is made to the drawings, in which:

Fig. 1 is a side elevation of a rotary tilling device embodying the principles of the present invention, part thereof being shown in section for clearness in illustration;

Fig. 2 is a top plan view of the device illustrated in Fig. 1, part thereof being shown in the section;

Fig. 3 is a fragmentary vertical sectional view of the device taken on the line 3—3 of Fig. 2;

Fig. 4 is a fragmentary sectional view taken on the line 4—4 of Fig. 3;

Fig. 5 is a fragmentary vertical sectional view taken on the line 5—5 of Fig. 2;

Fig. 6 is an enlarged rear elevation of one of the individual teeth of the rotary tool, a portion of the shaft being shown in connection therewith;

Fig. 7 is a right side elevation of the tool and portion of the shaft illustrated in Fig. 6.

Referring to the drawings, the device in general comprises a carriage, indicated generally at 1, and having an engine carrying portion 2 and a rotary tool carrying portion 3. The engine carrying portion 2 comprises essentially a top wall 4, depending side walls 5, and a front wall 6, and is open at the bottom and at the rear.

The tool carrying portion 3 comprises essentially a top wall 7 with depending side walls 8 and a sloping reinforcing wall 9 and is open at the bottom and forwardly. The carriage portion 2 is mounted by a suitable axle 10 on a pair of supporting wheels 11, the axle being arranged near the lower rear edge of the portion 2.

Manipulating handles 12 are detachably secured to the engine carrying portion 2 and extend upwardly and rearwardly therefrom to a

2 convenient position for grasping by the operator for raising and lowering the forward end of the engine carrying portion 2 and with it the tool carrying portion 3 by rocking the engine carrying portion 2 about the axle 10.

Mounted on the engine carrying portion 2 is a suitable gasoline motor 13 having a driving pulley 14.

On the tool carrying portion 3 is a power transmission mechanism which may comprise a transversely extending shaft 15 rotatably mounted in a suitable bearing and reinforcing sleeve 16 which, in turn, is mounted by its ends in the walls 8. On the shaft 15 is a driven pulley 18 which is drivingly connected by a belt 19 to the pulley 14. At the other end of the shaft 15 is a sprocket 20. Near the bottom portion of 3, is a rotary tool shaft 21 on which is a sprocket 22, the sprocket 22 being connected by a suitable chain 23 to the sprocket 20.

The shaft 21 is mounted at its ends in bearings 24 and 25, respectively, the bearings in turn being mounted in side walls 8, respectively. A suitable dust-proof housing 26 is connected to one of the side walls 8 and encloses the sprockets and chain.

The bearing 24, which is at the opposite end of the shaft 21 from the sprocket 22 is detachably connected to the side wall 8 on the outside thereof and has a portion which extends through a suitable slot 27 in the side wall 8. The slot 27 is open at the bottom of the side wall 8 and the bearing 24 is provided with a flange 28 which bridges across the slot 27 and is secured against the outer face of the wall 8 by means of suitable bolts 29, as best illustrated in Figs. 3 and 4. Thus by loosening the bolts 29, the bearing 24 may be slid off the end of the shaft 21 outwardly of the wall 8. Thus the bearing 24 can be moved outwardly axially of the shaft and out of the slot 27. The slot 27 is of sufficient size so that the individual tools can be passed therethrough and placed on the shaft by moving them flatwise axially of the shaft with their hubs coaxial with the shaft.

In order to drivingly connect and disconnect the engine pulley 14 from the driving pulley 18, the carriage portions 2 and 3 are hingedly secured together at their adjacent ends for swinging movement about a horizontal transverse axis which is parallel to the axes of the pulleys 14 and 18 but is offset from each. For this purpose suitable arms 30 are secured to the side walls of the portion 3 at the upper rear thereof and extend rearwardly therefrom. The opposite ends of the arms 30 are pivotally connected to the side walls 5 of the engine carrying portion 2 near the upper forward limit of the side walls 5. The arms 30 are preferably of strap metal, which, while reasonably rigid, can yield elastically a slight amount under severe shocks, thus relieving the carriage portion 2 from direct transmission of the full force of any shocks occasioned by the tools striking obstructions.

Rigidly connected to the tool carrying portion 3 is a bracket 34 on which is mounted an arm 35 which extends rearwardly beyond the rear of the engine carrying portion 2. At the rear of the carriage portion 2 the arm 35 is provided with a latch in the form of a pawl 37 which is urged forwardly by a suitable spring 38.

Mounted on the rear of the portion 2 is a depending bracket 39 having a vertical row of apertures adapted to receive the forward end of the pawl 37 for locking arm 35 in fixed relation to the carriage portion 2 in selected positions of the portions 2 and 3 about the pivotal axis of the arms 30. Since the pivotal axis of the arms 30 is offset from the axes of both pulleys 14 and 18, relative swinging movement of the carriage portions 2 and 3 about the axis disposes the pulleys different distances apart thus loosening and tightening the belt 19 for drivingly connecting and disconnecting the pulleys or for adjusting the tension on the belt.

The carriage portions 2 and 3 can be secured in any relatively rocked position about the axis of the arms 30 by means of the pawl 37.

Referring next to the rotary tool itself, the shaft 21 is non-circular and preferably is hexagonal in cross section at the tool receiving portion between its ends. The tool members, or teeth themselves, illustrated in Figs. 1 through 7, are primarily for tilling the soil. Each tooth, indicated at 40, comprises two pieces of flat strap metal welded together in face to face relation part way of their length to provide a tilling or manipulating end portion 41 of the tooth and spaced apart flatwise from each other for the remainder of their length to provide a hub 42. Thus the hub 42 is in the form of two arms 42a and 42b which are spaced apart from each other axially from the shaft 21 and are resiliently movable toward each other. Thus each hub is resiliently contractible endwise of the shaft. Between the hub arms 42a and 42b, near the juncture of the two pieces of metal, bosses 43 are struck out of the metal and are so arranged that they may engage each other, as best illustrated in Fig. 6, for limiting to some extent the movement of the arms 42a and 42b toward each other. Each tooth is provided at its operating end with a cutter 44 which preferably is forwardly extending and in the form of a hook. All of the teeth preferably are identical with each other and each is made of low carbon steel which is inexpensive, tough, and capable of absorbing heavy shocks without fracturing. The cutters 44 are preferably faced with hard steel alloys which may be deposited thereon by an electric arch process.

Each of the arms 42a and 42b of each tooth 40 is provided with a passage 45 which fits the hexagonal part of the shaft 21 with a substantial operating clearance so that the hub can oscillate slightly circumferentially of the shaft 21 and also can rock slightly laterally. Each tooth 40 with its hub is so shaped that, when moved to a position in which its hub is coaxial with the shaft 21 and its remainder extends vertically downwardly from the axis of the shaft 21, it may be slid off the end of the shaft flatwise and while parallel to its operating position and can pass through the opening 27 after the bearing 24 is removed. Thus the teeth can be assembled on the shaft, as illustrated in Fig. 3, each tooth being in a position in which it is offset about 60 degrees circumferentially of the shaft from each of the teeth adjacent to its opposite faces. The tools are assembled on the shaft 21 with the hub portions 42 in face to face abutting relation to each other, but are free to float endwise of the shaft except as restrained by each other. Since the hubs are resiliently contractible endwise of the shaft, when any tooth strikes an obstruction its hub can move slightly endwise of the shaft against the yieldable resistance of the other hubs.

As mentioned, the teeth are of strap metal pieces. The width of the cross section of each piece of metal is relatively small compared to the length. Thus the teeth are very rigid circumferentially of the shaft, but can yield resiliently, transversely of their path of circumferential travel. Since the hubs 42 engage the shaft 21 with substantial operating clearance such that each tooth can oscillate circumferentially of the shaft and rock endwise of the shaft, and since the metal of each tooth is elastically deflectable endwise of the shaft 21, due to the narrow cross section of the straps of which the hubs are formed, the tilling or manipulating portion 41 of each tooth is readily deflectable for a substantial but limited distance laterally of, and also along its path of travel about the axis of the shaft 21.

These relations are very important inasmuch as during tilling of the soil the manipulating portion is apt to strike solid obstructions such as hidden rocks or heavy roots. Were no yieldability provided for in the teeth and their connection with the shaft 21, but instead the shaft 21 were fitted tightly to the hubs of the teeth and the teeth themselves were rigid, the full force of the impact shock on a tooth when striking an obstruction would be transmitted to the driving mechanism and pulley 18. By providing for limited rocking of the teeth laterally and circumferentially for elastic deflection of the teeth, and for yieldably resisted floating movement of the teeth endwise of the shaft, sudden impact stresses are relieved. No one of these movements of an individual hub is very large, yet their cumulative effect greatly reduces transmitted stresses without interfering with normal operation of the device. For example, the hub may rock laterally through an angle of about five degrees and oscillate circumferentially a like amount. Accordingly, upon striking an obstruction there is a dampening effect by the teeth and shaft 21 so that the full force of the impact is not transmitted to the remainder of the mechanism. Furthermore, as mentioned, the hubs of the teeth slide readily axially of the shaft 21 and the hubs of adjacent teeth engage each other. There is nothing between the two arms 42a and 42b to prevent their movement by elastic deflection relatively toward each other. Thus each tooth can move bodily endwise of the shaft 21 by elastic deformation of the arms of its hub and the arms of hubs of other teeth on the shaft. Thus if the manipulating portion of a tooth strikes an obstruction a glancing blow and is deflected slightly, it can follow along a rather steep side of the obstruction by bodily movement a slight amount along the shaft 21.

While each of these factors permitting deflection of the manipulating portion of a tooth is small in itself, their cumulative effect is quite substantial and relieves the mechanism from considerable impact shocks and stresses.

To further reduce the stress which might be delivered to the engine and other parts, the belt 19 is preferably of the usual rubber impregnated fabric such as commonly used for automobile engine fan belts. Such a belt of itself tends to relieve stresses imposed by sudden stoppage of the pulley 18. Furthermore, since the arms 30 are resiliently deflectable, a slight amount flatwise, sudden stresses imposed on the tool carrying portion 2 due to the teeth striking obstructions are dampened and partially absorbed by slight lateral weaving of the carriage portion 3, and thus are not transmitted with full force to the engine 13.

It is to be noted that the hubs 42 are relatively narrow endwise of the shaft so as to permit the teeth to be arranged spirally in a row and close to each other endwise to the shaft 21.

Having thus described my invention, I claim:

1. A tooth member for a device of the character described, which device includes a rotatable tool carrying shaft having a tool receiving portion of non-circular cross section, and means to drive the shaft; said member including a hub portion, an intermediate portion connected at one end to, and radiating outwardly from, the hub portion, and a tooth portion connected to the outer end of the intermediate portion, said member comprising a pair of generally flat elongated metal straps which, throughout the extent of the hub portion, are spaced apart flatwise from, and are resiliently movable relative toward, each other and have aligned shaft passages therethrough and which, beginning at a location spaced from the hub portion and continuing to the outer end of the tooth portion are permanently bonded together in face to face relation to each other, and which at the intermediate portion, beginning at its juncture with the hub portion, are spaced flatwise from each other, said straps having bosses, respectively, on either adjacent face at said intermediate portion, and said bosses being mutually engageable with each other for maintaining a minimum spacing of the straps at said intermediate portion.

2. A tooth member for a device of the character described, which device includes a rotatable tool carrying shaft having a tool receiving portion of non-circular cross section and means to drive the shaft; said member comprising a pair of generally flat elongated metal straps disposed in face to face relation to each other and having, respectively, portions which, beginning at one end of the straps and extending part way toward the other end of the straps, are permanently bonded together in face to face relation and provide a tooth, and having, respectively, other portions which, beginning at the opposite end of the straps and extending part way toward said one end, are spaced apart flatwise from each other and are freely resiliently movable toward and away from each other and provide a hub, and said other portions having aligned shaft passages therethrough of non-circular shape for accommodating said shaft.

3. A tooth member for a device of the character described, which device includes a rotatable tool carrying shaft having a tool receiving portion of non-circular cross section, and means to drive the shaft; said member including a tooth, a hub, and an intermediate portion connecting the tooth and hub, and said hub and intermediate portion comprising a pair of metal straps which are secured in fixed position relative to each other at a part of the intermediate portion which is spaced from the hub and are spaced apart flatwise from each other and from said part to that edge of the hub which is opposite from the intermediate portion, the portions of the straps defining the hub being resiliently movable relatively toward each other throughout their extent and having aligned shaft passages therethrough, respectively, and said straps, where spaced apart at said intermediate portion, having bosses, respectively, on their adjacent faces which are mutually engageable with each other for maintaining a minimum spacing with the straps at said intermediate portion.

References Cited in the file of this patent

UNITED STATES PATENTS

| Number | Name | Date |
|---|---|---|
| 948,820 | Mosher | Feb. 8, 1910 |
| 1,227,089 | Tanczer | May 22, 1917 |
| 1,486,548 | Schrum | Mar. 11, 1924 |
| 2,244,099 | Chase | June 3, 1941 |
| 2,253,391 | Ohlendorf | Aug. 19, 1941 |
| 2,592,963 | Sherrow | Apr. 15, 1952 |

FOREIGN PATENTS

| Number | Country | Date |
|---|---|---|
| 298,119 | Great Britain | Oct. 11, 1928 |
| 7,114 | Australia | Apr. 26, 1932 |